US008660111B2

(12) United States Patent
Wiatrowski et al.

(10) Patent No.: US 8,660,111 B2
(45) Date of Patent: Feb. 25, 2014

(54) METHOD AND APPARATUS FOR TRACKING A CHANNEL TIMING CHANNEL MESSAGE AND SUPPORTING CHANNEL SCANNING IN A DIGITAL MOBILE RADIO SYSTEM

(75) Inventors: David G. Wiatrowski, Woodstock, IL (US); John P. Belmonte, Schaumburg, IL (US); Dipendra M. Chowdhary, Hoffman Estates, IL (US); Yueh Ching Chung, Georgetown (MY)

(73) Assignee: Motorola Solutions, Inc., Schaumbuirg, IL (US)

( * ) Notice: Subject to any disclaimer, the term of this patent is extended or adjusted under 35 U.S.C. 154(b) by 203 days.

(21) Appl. No.: 13/166,151

(22) Filed: Jun. 22, 2011

(65) Prior Publication Data

US 2012/0327928 A1     Dec. 27, 2012

(51) Int. Cl.
*H04W 56/00*     (2009.01)

(52) U.S. Cl.
USPC ........... 370/350; 370/345; 370/347; 370/348; 370/478; 370/442; 375/356; 375/366; 375/367; 375/368

(58) Field of Classification Search
USPC ......... 370/337, 345, 347, 348, 350, 478, 442; 375/356, 359, 365, 366, 367, 368
See application file for complete search history.

(56) References Cited

U.S. PATENT DOCUMENTS

| | | | | |
|---|---|---|---|---|
| 5,806,002 A * | 9/1998 | Wiatrowski et al. | ........... | 455/512 |
| 5,822,682 A * | 10/1998 | Schroderus et al. | .......... | 455/63.3 |
| 6,052,557 A * | 4/2000 | Kinnunen et al. | ................. | 455/9 |
| 6,144,656 A * | 11/2000 | Kinnunen et al. | ............ | 370/347 |
| 6,477,384 B2 * | 11/2002 | Schroderus et al. | .......... | 455/500 |
| 6,545,995 B1 * | 4/2003 | Kinnunen et al. | ............. | 370/341 |
| 7,593,372 B2 * | 9/2009 | Khoo et al. | ..................... | 370/336 |
| 7,983,210 B2 * | 7/2011 | Chowdhary et al. | .......... | 370/324 |
| 8,054,774 B2 * | 11/2011 | Dubreuille et al. | ........... | 370/314 |
| 8,358,968 B2 * | 1/2013 | Panpaliya et al. | ............. | 455/11.1 |
| 2002/0135518 A1 * | 9/2002 | Rabinowitz et al. | .......... | 342/464 |
| 2005/0185628 A1 * | 8/2005 | Watanabe et al. | ............. | 370/347 |
| 2005/0227615 A1 * | 10/2005 | Sakoda | .............................. | 455/7 |
| 2007/0025244 A1 * | 2/2007 | Ayyagari et al. | .............. | 370/229 |
| 2007/0165589 A1 * | 7/2007 | Sakoda | ......................... | 370/345 |
| 2007/0165695 A1 * | 7/2007 | Gerhardt et al. | .............. | 375/133 |
| 2008/0165759 A1 * | 7/2008 | Khoo et al. | .................... | 370/347 |
| 2009/0207865 A1 * | 8/2009 | Yonge et al. | ................... | 370/503 |
| 2009/0270030 A1 * | 10/2009 | Jia et al. | ........................... | 455/39 |
| 2010/0075704 A1 * | 3/2010 | McHenry et al. | ............. | 455/509 |

(Continued)

OTHER PUBLICATIONS

International Search Report and Written Opinion for counterpart International Patent Application No. PCT/US2012/041997 mailed on Jul. 30, 2012.

*Primary Examiner* — Ian N Moore
*Assistant Examiner* — Phong La (57) ABSTRACT

A method and apparatus for enabling a radio to track channel timing and support channel scanning A non-leading radio operating on a communications channel, determines a diffusion period during which channel timing is to be propagated from a leading radio to non-leading radios operating on the communications channel. The non-leading radio implements a first scanning pattern during the diffusion period to scan a CT designated channel for a control timing message with a timing signal sent from the leading radio. The first scanning pattern involves scanning the CT designated channel during every other scan interval and scanning non-priority channels and priority channels during scan intervals not used on the CT designated channel.

19 Claims, 6 Drawing Sheets

(56) References Cited

U.S. PATENT DOCUMENTS

| | | | |
|---|---|---|---|
| 2010/0086092 A1* | 4/2010 | Wiatrowski et al. | 375/362 |
| 2010/0087142 A1* | 4/2010 | Panpaliya et al. | 455/15 |
| 2010/0097952 A1* | 4/2010 | McHenry et al. | 370/252 |
| 2010/0098049 A1 | 4/2010 | Belmonte et al. | |
| 2010/0099404 A1 | 4/2010 | Khoo et al. | |
| 2010/0111099 A1* | 5/2010 | Yonge et al. | 370/458 |
| 2011/0087449 A1* | 4/2011 | Haartsen et al. | 702/89 |
| 2011/0096679 A1* | 4/2011 | Hayashino et al. | 370/252 |
| 2011/0142096 A1* | 6/2011 | Gerhardt et al. | 375/133 |
| 2011/0255521 A1 | 10/2011 | Bohn et al. | |
| 2011/0255527 A1 | 10/2011 | Chowdhary et al. | |

* cited by examiner

METHOD AND APPARATUS FOR TRACKING A CHANNEL TIMING CHANNEL MESSAGE AND SUPPORTING CHANNEL SCANNING IN A DIGITAL MOBILE RADIO SYSTEM

FIELD OF THE DISCLOSURE

The present disclosure relates generally Digital Mobile Radio (DMR) communications and more particularly to allowing radios operating in direct mode to track channel timing and support channel scanning.

BACKGROUND

In response to a growing need to improve the efficiency of radio communications systems, a Digital Mobile Radio (DMR) communications standard establishes protocols and other system requirements for communications on private mobile radios. Any DMR standards or specifications referred to herein may be obtained by contacting European Telecommunications Standard Institute (ETSI) at ETSI Secretariat, 650, Route des Lucioles, 06921 Sophia-Antipolis Cedex, FRANCE. A radio, as used herein, can be any mobile and/or fixed end equipment that is used to obtain DMR services. The DMR standard supports simultaneous and independent calls on a single radio channel. In particular, according to the standard, a 12.5 Kilohertz (kHz) bandwidth radio channel is divided into two alternating timeslots. Each timeslot acts as a separate communications path (sometimes also referred to as a channel or logical channel), which is different from a radio channel (physical channel) for two or more radios. Each radio operating on the radio channel communicates on an assigned timeslot according to, for example, a Time Division Multiple Access (TDMA) protocol.

To avoid interference between radios transmitting on the same physical channel (i.e., the same radio frequency (RF) channel) but different time slots, each radio should be aware of a common "channel timing" or "timeslot structure" for the physical channel. As used herein, channel timing is defined as a timing reference that defines boundaries for one or more of the time slots that make up the physical channel. The ETSI-DMR standard currently describes a means for an infrastructure device, such as a repeater, to provide common channel timing for radios operating in repeater mode. Therefore, when radios are operating in repeater mode, two different non-interfering calls can be supported on two TDMA time slots of a radio channel.

The ETSI-DMR standard also allows for radios to operate in talkaround or direct mode. In the talkaround or direct mode any radio can communicate with one or more other radios without the need for any additional infrastructure equipment (e.g. base stations or repeaters). Radios may operate in talkaround mode (in a system where the radios primarily use a repeater and occasionally communicate without a repeater) or in direct mode (in a system where the radios exclusively communicate without a repeater). In the current standard, when radios operate in talkaround or direct mode one timeslot is used and the other is left unused, which is spectrally inefficient because the available bandwidth is only being used for one half of the available time. A current solution to leaving one timeslot unused provides for using both timeslots (also known as 2:1 TDMA) when operating in direct mode or talkaround mode (herein referred to as operating in 6.25e TDMA Direct Mode or simply as operating in direct mode).

To minimize channel traffic associated with radios requesting the channel timing, one radio operating on the radio channel (in either timeslot) is selected as a channel timing leader. The channel timing leader intermittently transmits a timing signal in at least one channel timing (CT) message to other radios operating on the radio channel. The other radios operating on the radio channel adjust their transmission clocks based on the timing signal transmitted from the timing leader. The radios capable of receiving the timing signal transmitted from the timing leader also diffuse or propagate the timing signal to other radios operating on the RF channel which would cause clock adjustments triggered by the leader or other radios. The 6.25e TDMA Direct Mode feature requires that all direct mode radios monitor a predefined radio channel for the CT message and cooperatively define and maintain (over time) the TDMA channel structure to be used with all transmissions on the radio channel.

However, radios may also implement a scan feature. The scan feature allows the radio to constantly check for activity on multiple channels in the radio's unique scan list by monitoring a set of specific channels (frequencies and timeslots) according to a predetermined sequence, when scanning. Radios implementing the scan feature are therefore unable to continuously monitor the predefined radio channel for the CT message to participate in the management of TDMA channel timing.

Accordingly, there is a need for a method and apparatus for allowing radios operating in direct mode to both track channel timing and support channel scanning.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3a-FIG. 3f are block diagrams of scan patterns implemented during a diffusion window and outside of the diffusion window in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for enabling a radio to track channel timing and support channel scanning. A non-leading radio operating on a communications channel, determines a diffusion period during which channel timing is to be propagated from a leading radio to non-leading radios operating on the communications channel. The non-leading radio implements a first scanning pattern during the diffusion period to scan a CT designated channel for a control timing message with a timing signal sent from the leading radio. The first scanning pattern involves scanning the CT designated channel during alternate scan intervals and scanning non-priority channels, priority channels and optionally a user selected channel during scan intervals not used on the CT designated channel. The non-leading radio also scans, outside of the diffusion period, the non-priority channels, the priority channels and optionally the CT designated channel or the user selected channel using a second scanning pattern that is different from first scanning pattern.

Figure 1:
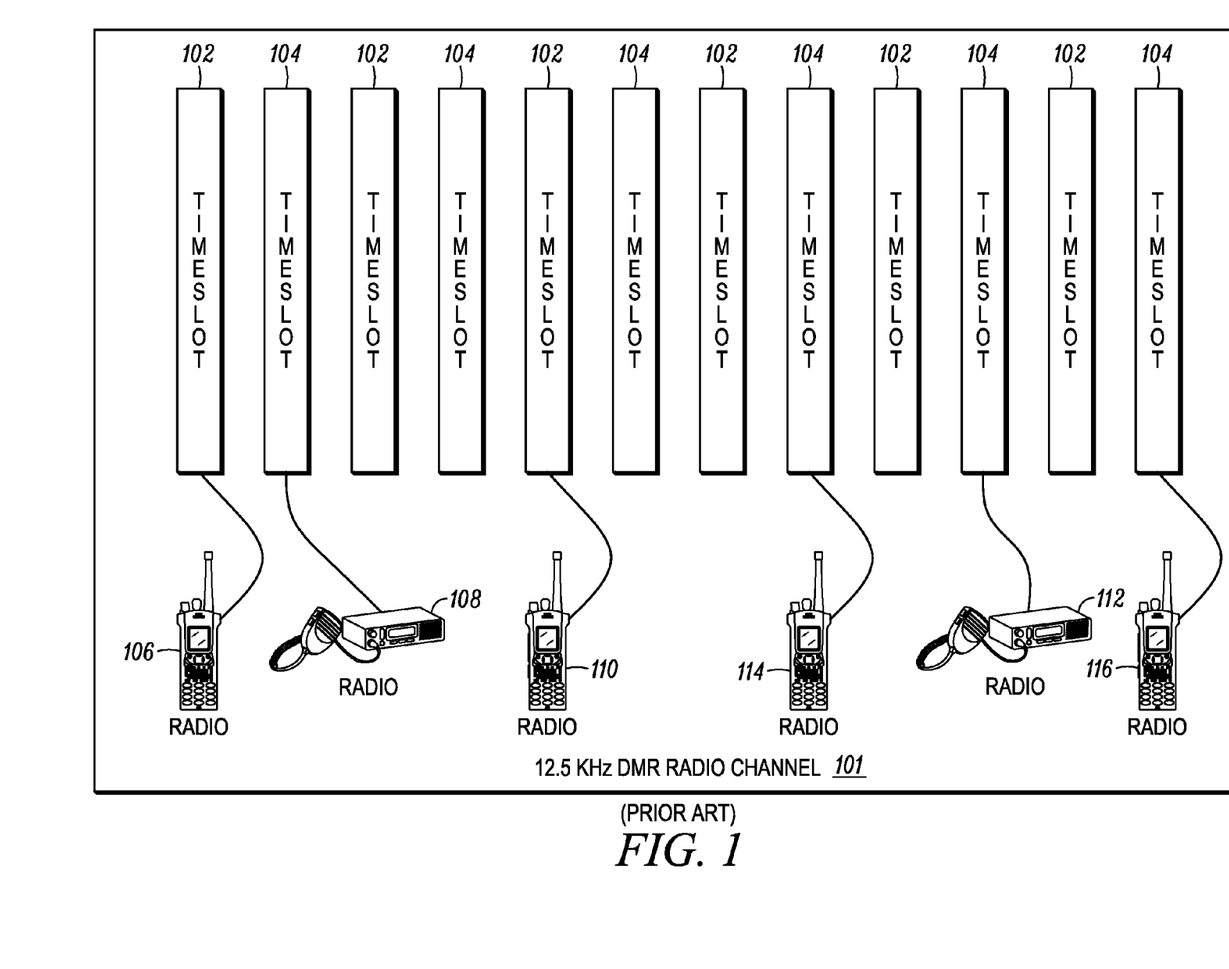
FIG. 1 is a block diagram of a radio channel with separate communications paths in accordance with some embodiments.

FIG. 1 illustrates a Digital Mobile Radio (DMR) channel with separate communications paths in accordance with some embodiments. As is known to those skilled in the art, a DMR channel is a 12.5 Kilohertz (kHz) bandwidth radio channel where assigned radios can make simultaneous and independent calls using, for example, a Time Division Multiple Access (TDMA) protocol. Each radio is capable of communicating directly with one or more other radios using TDMA techniques in which specified time segments are divided into assigned time slots for individual communications. In some embodiments, one or more radio is further capable of communicating with infrastructure equipment such as a repeater (not shown). Each radio frequency (RF) in the system carries time slots, wherein each time slot is known as a "channel." Although FIG. 1 shows a DMR radio channel, it should be noted that this is only one example of a radio channel that may be used in embodiments.

In FIG. 1, DMR radio channel 101 is divided into two alternating timeslots 102 and 104 each of which acts as a separate communications path (logical channel) between two or more radios, wherein two different non-interfering calls can be supported on timeslots 102 and 104 of DMR radio channel 101. A radio, as used herein, can be mobile and/or fixed end equipment that is used to obtain DMR services. For example, a radio can be a mobile radio (such as, a portable radio, a mobile station, a mobile phone, a mobile data terminal, a Personal Digital Assistant (PDA), a laptop, a two-way radio, a cell phone), or can be a fixed station (such as, a fixed control station, a base station, and any supporting equipment such as wireline consoles and packet data switches).

As shown in FIG. 1, radios 106 and 110 are configured to communicate on timeslot 102 and radios 108, 112, 114 and 116 are configured communicate on timeslot 104. Although the discussion below is directed to a DMR radio channel that is divided into two timeslots (2:1 TDMA), the present teachings may be applied to other arrangements such as 4:1 TDMA or 6:1 TDMA. In the arrangement shown in FIG. 1, each communication path is active for half of the time in 12.5 kHz of radio channel bandwidth. This enables radios 106-116 to operate with existing licensed 12.5 kHz bandwidth channels, while doubling the capacity of DMR radio channel 101. It should also be noted that although the discussion is direct to using TDMA protocol, some embodiments may use Frequency Division Multiple Access (FDMA) protocol or another similar protocol.

In one illustrative implementation, radios 106-116 operate in 6.25e 2:1 TDMA direct mode (i.e., two slots 102 and 104 per physical channel, each slot being 30 ms in length), wherein 6.25e operation refers to 6.25 kilohertz (kHz) equivalent spectral efficiency (where one 12.5 kHz TDMA bandwidth channel supports two communication channels). Radios 106-116 may also therefore be referred to herein as direct mode radios. The TDMA slot lengths, slotting ratios and channel bandwidth example noted above are in no way meant to limit the scope of the present teachings, and the teachings apply to other slotting ratios and channel bandwidths.

In each radio channel, one radio is selected as a leading radio (also referred to herein as the timing leader). The leading radio transmits channel timing (CT) messages to other radios operating on the radio channel. The leading radio transmits the CT messages following its DMR TDMA timeslot alignment. Each radio operating on the radio channel includes a TDMA timeslot timer and a synchronization algorithm, where the leading radio's timeslot alignment is maintained by its TDMA timeslot timer and synchronization algorithm. The TDMA timeslot timer and the radio synchronization algorithm determine, for example, the timing boundaries for timeslot 102 and timeslot 104. When other radios operating on the radio channel receive CT messages from the leading radio, the synchronization algorithm in each of the other radios is used to determine a synchronization pattern timing which is present in the middle of each CT message. The synchronization pattern timing in each of the other radios is passed to an associated TDMA timeslot timer. The TDMA timeslot timer in each of the other radios compares the received synchronization pattern timing with expected synchronization pattern timing. If there is a difference between the received synchronization pattern timing and the expected synchronization pattern timing, the TDMA timeslot timer in each of the other radios adjusts its timing to match that of the leading radio.

In an embodiment, radios 106-116 operate over a "wide" area in which at least one radio has a transmission range that does not overlap with the transmission range of another radio in the system. As such, each radio 106-116 is characterized by a generation number or value that provides an indication of how far away the radio is from the timing leader. As noted above, the timing leader establishes the channel timing for a radio channel. Therefore, the timing leader is the only radio operating on a given physical channel (radio channel) that is assigned a generation number zero (0) identifier. In other words, the timing leader plays a role similar to a stratum-1 clock in the sense that it does not adjust its clock based on the messages received, except possibly when the timing leader first joins a system. However, the other radios adjust their clocks in order to remain as synchronized as possible with the timing leader's clock.

The generation zero (0) radio or timing leader is elected for a given physical channel using any suitable election process. A suitable election rule can include, for example, selecting the radio with the highest identification (ID) as the leader, selecting the radio with the lowest ID as the leader, or selecting the radio with the highest provisioned priority attribute as the leader, to name a few parameters. All other generation numbers associated with the physical channel are determined with respect to the generation zero (0) radio. More particularly, radios assigned the generation one (1) identifiers are those radios that can receive CT messages directly from the timing leader. Radios assigned the generation two (2) identifiers are those radios that can receive CT messages directly from generation one (1) radios. Radios assigned the generation three (3) identifiers are those radios that can receive CT messages directly from generation two (2) radios, and so on. In general, radios assigned generation N+1 identifiers are those radios that can directly receive transmissions from generation N radios, and cannot directly receive transmissions from any radio with an identifier lower than generation N. Accordingly, a higher generation number or value (or more simply stated a higher generation) for a radio indicates that the radio is further away from the timing leader than a radio having a lower generation.

According to an embodiment, in order to obtain the CT messages transmitted from the timing leader, each direct mode non-leading radio is configured to scan only a CT designated channel for the CT messages transmitted from the timing leader. Note that the CT messages could be CT messages that were received and retransmitted (propagated) by other non-leading radios (radios with generation values greater than zero). In some embodiments, the CT designated channel is a selected channel that is selected by the radio's operator via a channel mode selector switch on each non-leading radio. In other embodiments, the CT designated channel is a last landed channel (a channel last used for transmitting or receiving by a scanning radio). In another embodiment, the CT designated channel is another channel that is designated by the radio's operator or system administrator (other than the selected channel or the last landed channel).

In an embodiment, if radio 106 is elected as the timing leader, each non-leading radio 108-116 tracks only its CT designated channel for CT messages transmitted directed from radio 106 or propagated by other non-leading radios 108-116. Therefore, CT messages from radio 106 must be received on the CT designated channel to avoid a "hidden node problem" (i.e. where a node is not visible to other nodes in the network and two or more nodes try to transmit data at the same time, resulting in interference at a receiving radio) when a non-leading radio transmits on the CT designated channel.

The CT message transmitted from the timing leader (for example, radio 106) may be one or more CT control signaling block (CSBK) messages. In some embodiments, the timing leader periodically, for example every two hundred and seventy (270) seconds, transmits a CT CSBK Beacon that announces the channel timing. The period during which the leading radio transmits the CT CSBK Beacon is known as a beacon interval. Other radios (for example radios 108-116) receiving the CT CSBK Beacon retransmit the CT CSBK Beacon as CT CSBK Forced Propagation. The CT CSBK Beacon and Forced Propagation are only transmitted when the RF channel is clear of all other transmissions (in either timeslot). Therefore, transmissions of the CT CSBK Beacon and Forced Propagation may be delayed and transmissions of the CT CSBK Beacon and Forced Propagation may not occur at the specific time in the predefined beacon interval when transmission should occur.

Consequently, a diffusion window is created at the beginning of every beacon interval. The diffusion window (also referred to herein as a diffusion period) is a predefined period at the beginning of every beacon interval when channel timing is propagated from the timing leader to other radios on the channel and when the CT CSBK Beacon or Forced Propagation will most likely be on the CT designated channel. Therefore, during the diffusion window of every beacon interval, radios that have the scan feature enabled, or radios that are "scanning", are configured to "aggressively" scan the CT designated channel for the CT CSBK Beacon or Forced Propagation on the CT designated channel. In an embodiment, aggressive scanning means, during the diffusion period, a radio visits/scans the CT designated channel during every other scan interval (meaning the radio alternately scans between the CT designated channel and another channel identified by a radios scan list). In other embodiments, aggressive scanning means, during the diffusion period, a radio visits/scans the CT designated channel during every third or fourth scan interval. In any event, during the diffusion period, a radio visits/scans the CT designated channel more frequently than it would outside of the diffusion period.

Consider the following example, if a radio is currently configured to scan four equal priority channels, the radio typically scans one channel after the other and repeats the scanning pattern throughout the beacon interval. Accordingly, the radio will scan channel one (1), then channel two (2), then channel three (3), and then channel four (4), and the radio will repeat this scan pattern throughout the beacon interval. According to an embodiment, during the diffusion period, the radio aggressively scans the CT designated channel. Meaning, during the diffusion period using the example above, the radio scans channel one (1), then the CT designated channel, then channel two (2), then the CT designated channel, and so on. It should be noted that the CT designated channel may or may not be one of the four equal priority scan channels (e.g., channel 3 could be the same as the CT designated channel). The radio repeats the aggressive scanning pattern until the diffusion period expires. This maximizes the likelihood of non-leading radios 108-116 receiving the channel timing, as the CT CSBK Beacon or Forced Propagation will most likely be on the CT designated channel during the diffusion period. Outside of the diffusion period, the radio is configured to return to the typical scan pattern where the radio may scan the CT designated channel as a normal equal priority channel (that is, if one of the equal priority channels is the same as the CT designated channel, then it continues to be scanned, otherwise it is not scanned outside of the diffusion period).

To ensure that the CT CSBK Beacon and Forced Propagation bursts are picked up by radios 108-116, the duration of the CT CSBK Beacon and Forced Propagation bursts is extended. For example, the duration of the CT CSBK Beacon and Forced Propagation bursts may be extended from a single 27.5 msec transmission burst to a ten (10) burst transmission occupying six hundred (600) msec. The duration may be extended by inserting a prefix with, for example, a predefined number of Preamble CSBKs, CT CSBK Beacons or CT CSBK Forced Propagation bursts. It should be noted that protocols for creating Preamble CSBK may be obtained by contacting European Telecommunications Standard Institute (ETSI) at ETSI Secretariat, 650, Route des Lucioles, 06921 Sophia-Antipolis Cedex, FRANCE and are defined in ETSI TS 102 361-2. It should also be noted that the prefix could be any number of bursts; however ten (10) burst provides for good performance. Those of ordinary skill in the art will further note that the duration of the prefix is typically much shorter than the duration of a standard known scan preamble, which may be several seconds in duration, based on the number of channels assumed to be in scanning radios' scan lists. The exact computed value of predefined prefix is dependent upon, for example, the probability of unqualified channel activity on another scan list member, the amount of time required to determine that activity is unqualified, or the desired probability of receiving CT CSBK Beacon or Forced Propagation when present on the CT designated channel, to name a few parameters. In any case, the duration of the CT CSBK Beacon and Forced Propagation burst is extended with sufficient preambles to attract the attention of radios 108-116, without inserting too many preambles to clog up the channel with excessively large transmissions.

A synchronization age field (sync age) is provided in each CT message to indicate the synchronization age of the leading radio 106. The synchronization age indicates an elapsed period from when the leading radio last transmitted CT message(s) to refresh the channel timing. If a CT CSBK Beacon transmission is delayed because, for example the channel is busy, the transmitted sync age value is adjusted to reflect the amount of the delay. This allows radios 108-116 to determine the start of the next beacon interval and to determine the diffusion window in each beacon interval.

At the beginning of the diffusion window, the leading radio, if scanning, will momentarily stop scanning and transmit a CT CSBK Beacon to generation one radios for further propagation to radios of higher generations. When a radio receives an original CT CSBK Beacon or Forced Propagation burst, it temporarily suspends scanning and starts a random holdoff timer (also referred to as a random holdoff window). The radio transmits the original CT CSBK Forced Propagation burst when the random holdoff timer expires or it cancels the random holdoff timer if it receives another CT CSBK burst of equivalent (or better) quality.

To determine whether the newly received CT CSBK is of equivalent (or better) quality, the radio examines parameters contained within the newly received CT CSBK to obtain values for parameters, such as the source identifier of the CT CSBK, a Leader ID, a Sync Age, and the generation, and compares the values of these parameters with the values of parameters in the original CT CSBK Beacon or Forced Propagation burst. This assumes that the original CT CSBK and the newly received CT CSBK both have a non-zero Leader ID. When Leader ID is zero, this means that a leader is not known and a different sort of comparison is made. If the radio is executing a rule that defines a better or preferred Leader ID as one with a larger value, if the value of the newly received Leader ID or source identifier is greater than the value of the Leader ID or source identifier in the original CT CSBK, then the newly received CT CSBK is determined to be of better quality. Conversely, if the value of the newly received Leader ID or source identifier is less than the value of the Leader ID or source identifier in the original CT CSBK, then the newly received CT CSBK is determined to be of poorer quality. If, however, the value of the newly received Leader ID or source identifier is equal to the value of the Leader ID or source identifier in the original CT CSBK, then the newly received Leader ID or source identifier (but not necessarily the CT CSBK) is determined to be of equivalent quality and another parameter, for example the sync age parameter, is also examined to determine whether the newly received CT CSBK is of equivalent (or better) quality.

If the radio is also executing a rule that defines a better or preferred sync age as one with a smaller value, if the value of the newly received sync age is less than the value of the sync age in the original CT CSBK, then the newly received CT CSBK is determined to be of better quality. On the other hand, if the value of the newly received sync age is greater than the value of the sync age of the original CT CSBK, then the newly received CT CSBK is determined to be of poorer quality. If the value of the newly received sync age is equal to the value of the sync age of the original CT CSBK, then the newly received sync age (but not necessarily the CT CSBK) is determined to be of equivalent quality to that of the original CT CSBK and another parameter, such as the generation parameter is also examined to determine whether the newly received CT CSBK is of equivalent (or better) quality.

If the radio is further configured to execute a rule defining a better or preferred generation as one with a smaller value, if the value of the newly received generation is smaller than the value of the generation of the original CT CSBK, then the newly received CT CSBK is understood to be of better quality. If the value of the newly received generation is larger than the value of the generation of the original CT CSBK, then the newly received CT CSBK is understood to be of poorer quality. If the value of the newly received generation is equal to the value of the generation of the original CT CSBK, then the newly received generation and therefore the entire CT CSBK is determined to be of equivalent quality.

It should be understood by one of ordinary skill in the art that the parameters described and compared above are examples of parameters in the CT CSBK that can be used to determine the quality of the CT CSBK. Other parameters not described above could also be used to determine the quality of the CT CSBK. At any stage of these comparisons of parameters (first Leader ID/source ID, second Sync Age, third Generation), if it is determined that the newly received CT CSBK is of better quality than the original CT CSBK or if the newly received CT CSBK is determined to be of equivalent quality as the original CT CSBK, then the random holdoff timer is cancelled and the CT CSBK Forced Propagation is not transmitted. Accordingly, a newly received CT CSBK Beacon or Forced Propagation burst is determined to be of equivalent or better quality to a previously received CT CSBK if parameters in the newly receive CT CSBK, for example the Leader ID, the sync age, and/or the generation value, are consider to be equivalent or better than the parameters of the original CT CSBK, depending on rules being executed by the radio. After canceling the random holdoff timer or transmitting the CT CSBK Forced Propagation burst, the radio resumes aggressive scanning or normal scanning, depending on whether or not the radio is scanning in the diffusion window. If the radio is still within the diffusion window, then the radio uses aggressive scanning, else the radio uses normal scanning.

Figure 2:
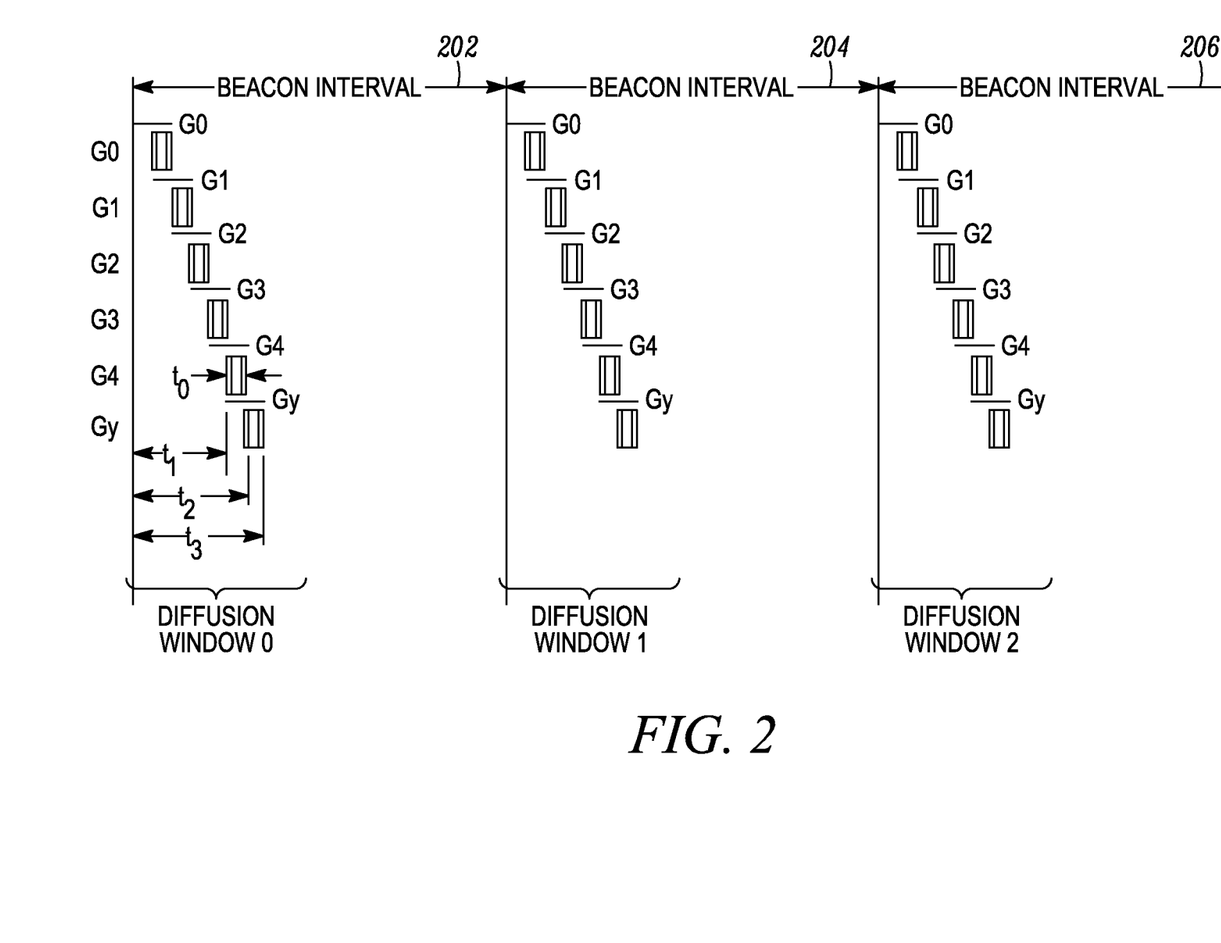
FIG. 2 is a diagram of how timing messages are transmitted during beacon intervals in accordance with some embodiments.

FIG. 2 is a block diagram of how timing messages are transmitted during beacon intervals in accordance with some embodiments. Radios in FIG. 2 are identified by generation values $G_0$-$G_y$, with $G_0$ being the timing leader and $G_y$ being the radio(s) furthest from the timing leader. Generation $G_1$-$G_y$ radios are configured to aggressively scan the CT designated channel during diffusion periods. FIG. 2 shows three beacon intervals 202-206, each with a diffusion window, defined as diffusion windows 0-2, respectively. As previously noted, each diffusion window is a predefined period at the beginning of beacon intervals 202-206. In an embodiment, each beacon interval 202-206 is defined to be approximately two hundred and seventy (270) seconds and each diffusion window is defined to be approximately the first sixty (60) seconds of beacon intervals 202-206. The exact duration of the diffusion window is determined primarily by the number of anticipated generations (hops away from the leading radio) and by the size of the random hold-off window. During the diffusion window, generation $G_1$-$G_y$ radios aggressively scan the channel during every other scan interval, at least every other (i.e., every $2^{nd}$) scanned member. This effectively gives the CT designated channel a higher priority than user defined priority channels.

As previously noted, in addition to performing aggressive scans during diffusion windows 0-2, generation $G_1$-$G_y$ radios may implement a scan feature which requires each radio to constantly check for activity on multiple channels in the radio's scan list. For example, each radio $G_1$-$G_y$ may be required to constantly scan up to sixteen channels in its unique scan list. Therefore, the scanning patterns implemented in embodiments allow the radios to monitor the CT designated channel for the channel timing, as well as, implement the scan feature.

Figure 3A:
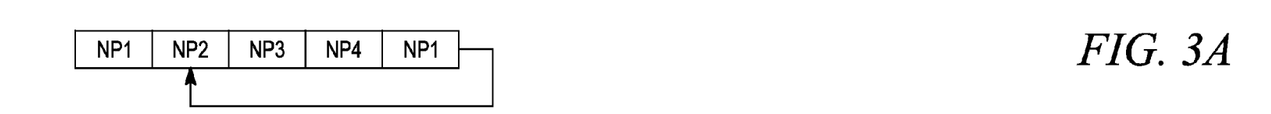
Figure 3B:
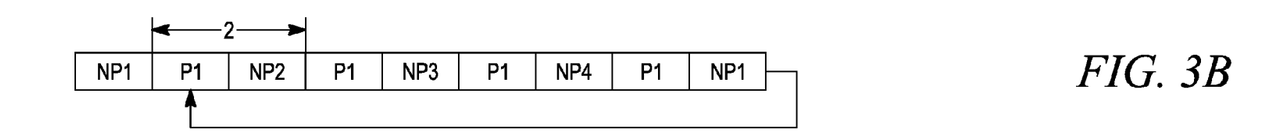
Figure 3C:
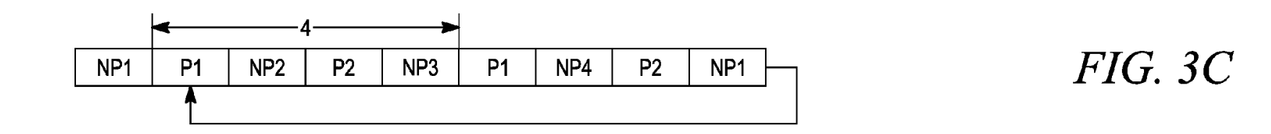
Figure 3D:
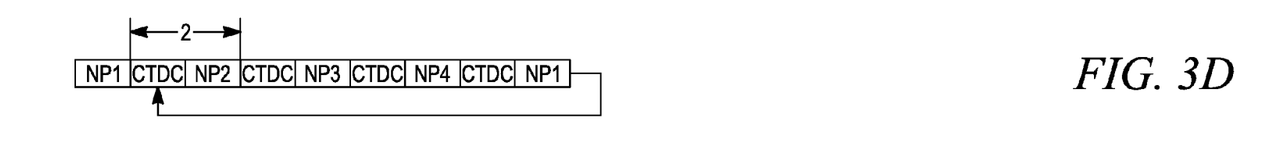
Figure 3E:
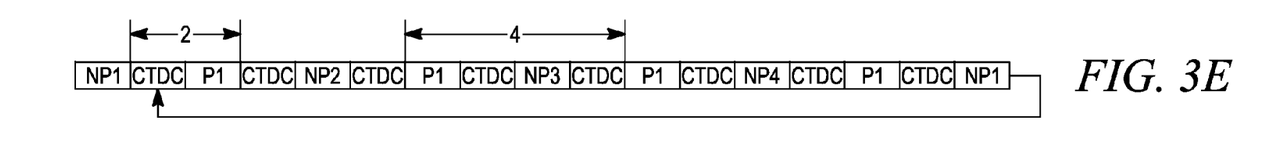
Figure 3F:
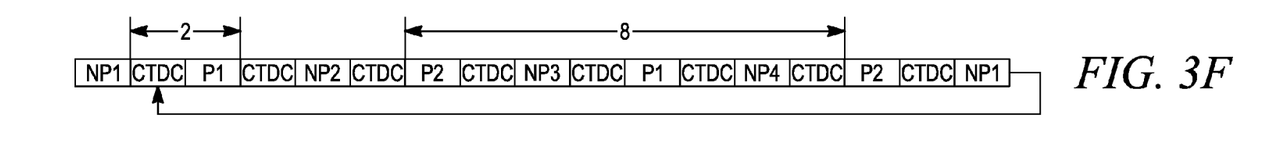

FIG. 3A-FIG. 3F are block diagrams of scan patterns implemented during and outside of a diffusion window in accordance with some embodiments. In particular, FIGS. 3A, 3B and 3C show scan patterns outside of a diffusion window and FIGS. 3D, 3E and 3F show scan patterns within the diffusion window. In FIGS. 3D, 3E and 3F, the CT designated channel is denoted as (CTDC). In FIGS. 3A-3F, a non-priority channel is denoted as (NP) and a priority channel is denoted as (P). The CT designated channel could also be a non-priority channel, a priority one (1) channel (highest user-designated priority), or a priority 2 channel (second highest user-designated priority). Note that additional levels of priority could be defined in other embodiments. In some embodiments, each channel is visited or scanned for about fifty (50) to one hundred (100) msec, assuming that no activity is found on the visited channel. In the pattern shown in FIGS. 3A, 3B and 3C, there are four non-priority channels (NP1-NP4), each of which may be in a radio's unique scan list and one of which may be the CT designated channel.

In the pattern shown in FIG. 3A, the radio repeatedly scans the non-priority channels in a sequential manner. Accordingly, the radio scans NP1, then NP2, NP3 and NP4 and repeats the scanning pattern throughout each beacon interval.

Comparing the pattern of FIG. 3A to the pattern shown in FIG. 3D, during the diffusion period of each beacon interval, the radio aggressively scans the CT designated channel. In particular, the radio visits/scans the CT designated channel during every other scan interval to obtain CT messages. Note the CT designated channel could be a voice designated transmission channel. Accordingly, the radio scans NP1, then CTDC, then NP2, then CTDC, and so on. Outside of the diffusion window, the radio returns to the scan pattern of FIG. 3A, that is, to repeatedly scanning the non-priority channels in a sequential manner for the remainder of the beacon interval.

In the example shown in FIG. 3B, the radio is configured to scan four non-priority channels (NP1-NP4) and a priority channel (P1). The priority channel may be, for example, a dispatcher channel. The radio scans the priority channel during every other scan interval. Therefore, the radio scans NP1, then P1, then NP2, then P1, and so on, and repeats the scanning pattern throughout each beacon interval.

Comparing the pattern of 3B to the pattern shown in FIG. 3E, the radio is configured to scan NP1-NP4, P1 and a CT designated channel. During the diffusion window in each beacon interval, the radio scans the CT designated channel during every other scan interval. Hence, the radio scans NP1, then CTDC, then P1, then CTDC, then NP2, then CTDC, then P1, the CTDC, and so on. Outside of the diffusion window, the radio returns to the scanning pattern of FIG. 3B, that is, to repeatedly scanning the priority channel during every other scan interval.

In another example, in FIG. 3C the radio scans four non-priority channels (NP1-NP4) and two priority channels (P1 and P2). The radio alternates the scanning of the priority channels during every other scan interval. Therefore, the radio scans NP1, then P1, then NP2, then P2, then NP3, then P1, and so on, and repeats the scanning pattern throughout each beacon interval.

Contrasting the pattern in FIG. 3C with a pattern shown in FIG. 3F, in addition to NP1-NP4 and P1-P2, the radio also scans a CT designated channel. Hence, during the diffusion window in each beacon interval, the radio scans NP1, then CTDC, then P1, then CTDC, then NP2, then CTDC, then P2, the CTDC, and so on. Outside of the diffusion window, the radio returns to the scanning pattern of FIG. 3C, that is, to alternate the scanning of the priority channels during every other scan interval.

In the patterns shown in FIGS. 3A, 3B and 3C, the radio may check for CT messages once during several hundred msec, assuming that no activity is found on the visited channel. In the patterns shown in FIGS. 3D, 3E and 3F, on the other hand, the radios check for CT messages approximately every ninety (90) msec, assuming that no activity is found on the visited channel. The aggressive scanning technique implemented in FIGS. 3d, 3e and 3f undesirably reduces the rate of checking priority channels by half, but desirably increases the rate of checking for CT CSBK messages on the CT designated channel. Hence, in some embodiments, the aggressive scanning technique is performed only during the diffusion window. By combining the aggressive scanning technique with non-aggressive scanning techniques, non-leading radios are allowed to adequately monitor the CT designated channel for the channel timing, as well as, implement the scan feature.

Figure 4:
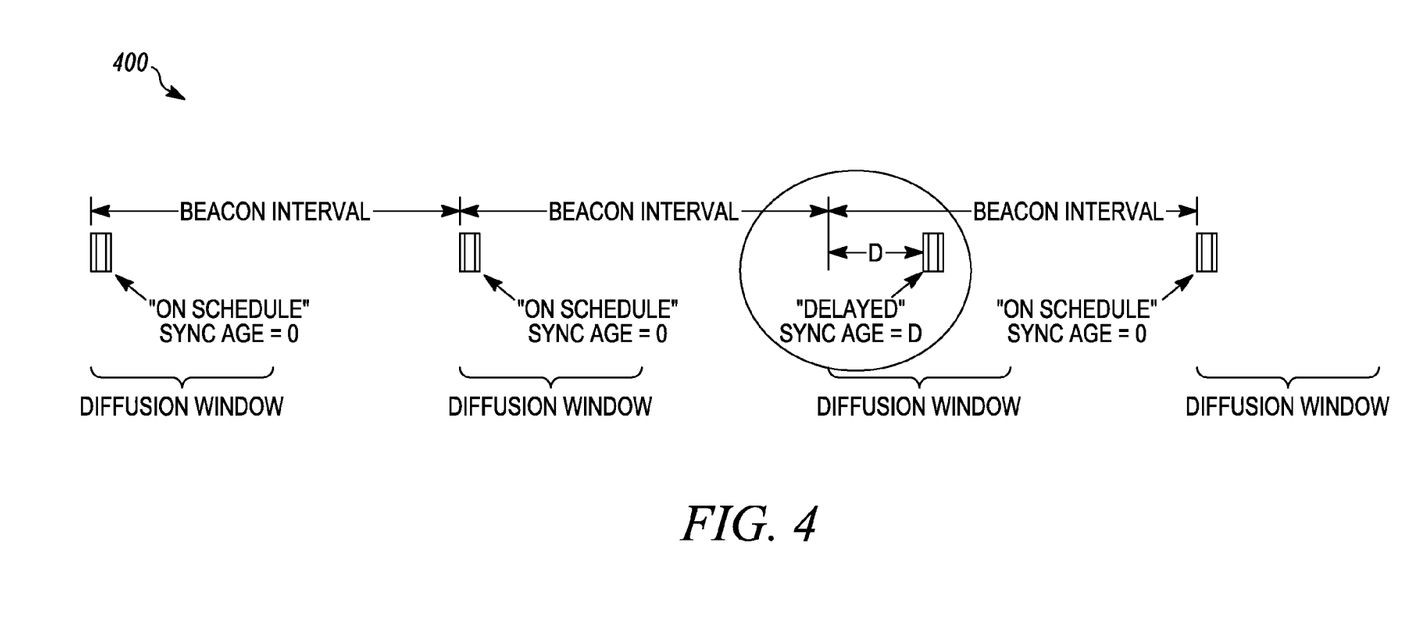
FIG. 4 is a diagram of how the diffusion window is set after a transmission delay in accordance with some embodiments.

FIG. 4 is a block diagram of how the diffusion window is set after a transmission delay in accordance with some embodiments. As noted previously, the CT CSBK Beacon transmission may be delayed due to a busy channel condition. If a delay occurs and the leading radio's sync age value is equal to the length of beacon interval, the value of the leading radio's sync age is reset to zero at a scheduled time (for example, at the end of the beacon interval). At the time of the CT CSBK Beacon transmission, the value of the leading radio's synchronization age counter is included in the CT CSBK Beacon. Typically, CT CSBK Beacons are transmitted with a sync age value of zero. However, if the transmission of the CT CSBK Beacon is delayed by D seconds, the transmitted sync age counter will be set to indicate D seconds, as shown in the circled area of FIG. 4. This enables non-leading radios to determine the location of the diffusion window at all times.

If a radio (first radio) does not receive a CT CSBK Beacon or Forced Propagation for a predefined time period, for example, for two beacon intervals (which is up to five hundred and forty (540) seconds in an embodiment), the first radio transmits a CT CSBK Request for timing during the diffusion window, when other radios are known to be aggressively scanning. This increases the likelihood of receiving a response. The first radio makes a first CT CSBK Request without a currently known scan preamble and if no response is received, the first radio makes a second CT CSBK Request with the currently known scan preamble. In some embodiments, the first radio announces its generation value in the CT CSBK Request. When a second radio receives the CT CSBK Request, it starts a random holdoff timer before responding to the CT CSBK Request. If a third radio responds to the CT CSBK Request before the second radio's random holdoff timer expires, the second radio may stop its random holdoff timer and will not attempt to respond to the CT CSBK Request, if the third radio is the same or a lower generation than the second radio.

Figure 5:
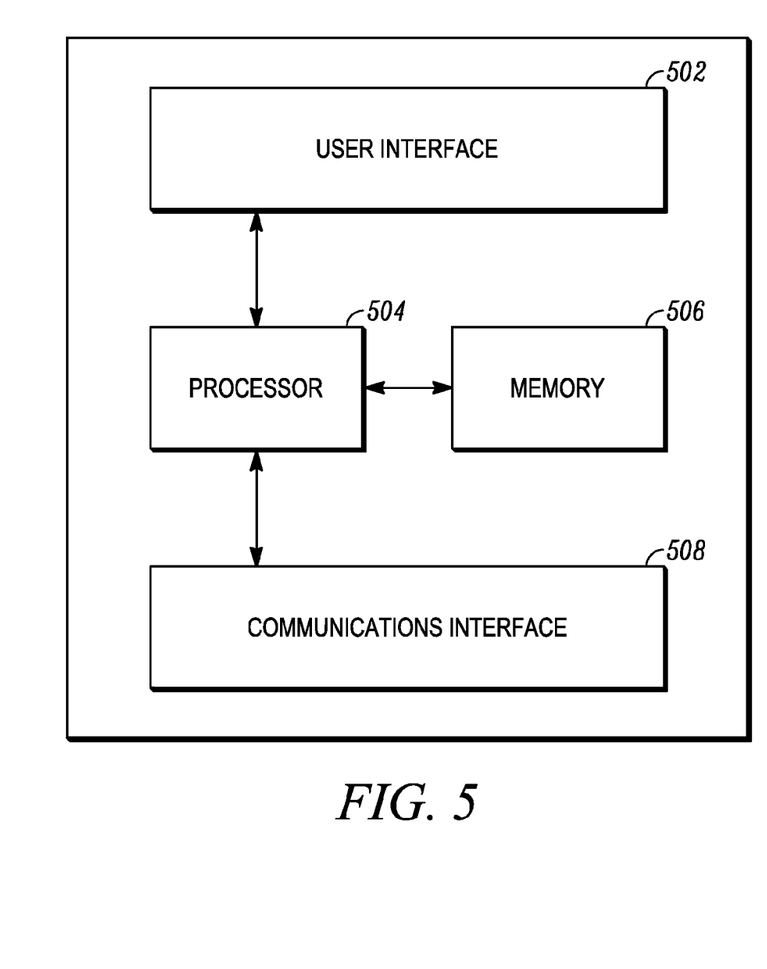
FIG. 5 is a block diagram which illustrates components of a typical radio in accordance with some embodiments.

FIG. 5 is a schematic diagram which illustrates components of a typical wireless radio, in accordance with some embodiments. According to an embodiment of the present invention. The radio includes a user interface 502 such as a keypad, display or touch sensor; a processor 504 to control operating features of the radio; a memory 506 to store, for example, data and computer program code components; and a wireless networking communication interface 508, which enables the radio to communicate wirelessly with other radios. The user interface 502, memory 506 and communication interface 508 are each operatively connected to the processor 504. Those skilled in the art will appreciate that the memory 502 may include various types of memory such as a random access memory (e.g., static random access memory (SRAM)), read only memory (e.g., programmable read only memory (PROM)), electrically erasable programmable read only memory (EPROM), or hybrid memory (e.g., FLASH), as is well known in the art. The processor 504 accesses a computer usable medium in the memory 502, which medium includes computer readable program code components configured to cause the radio to execute the functions described herein.

Figure 6:
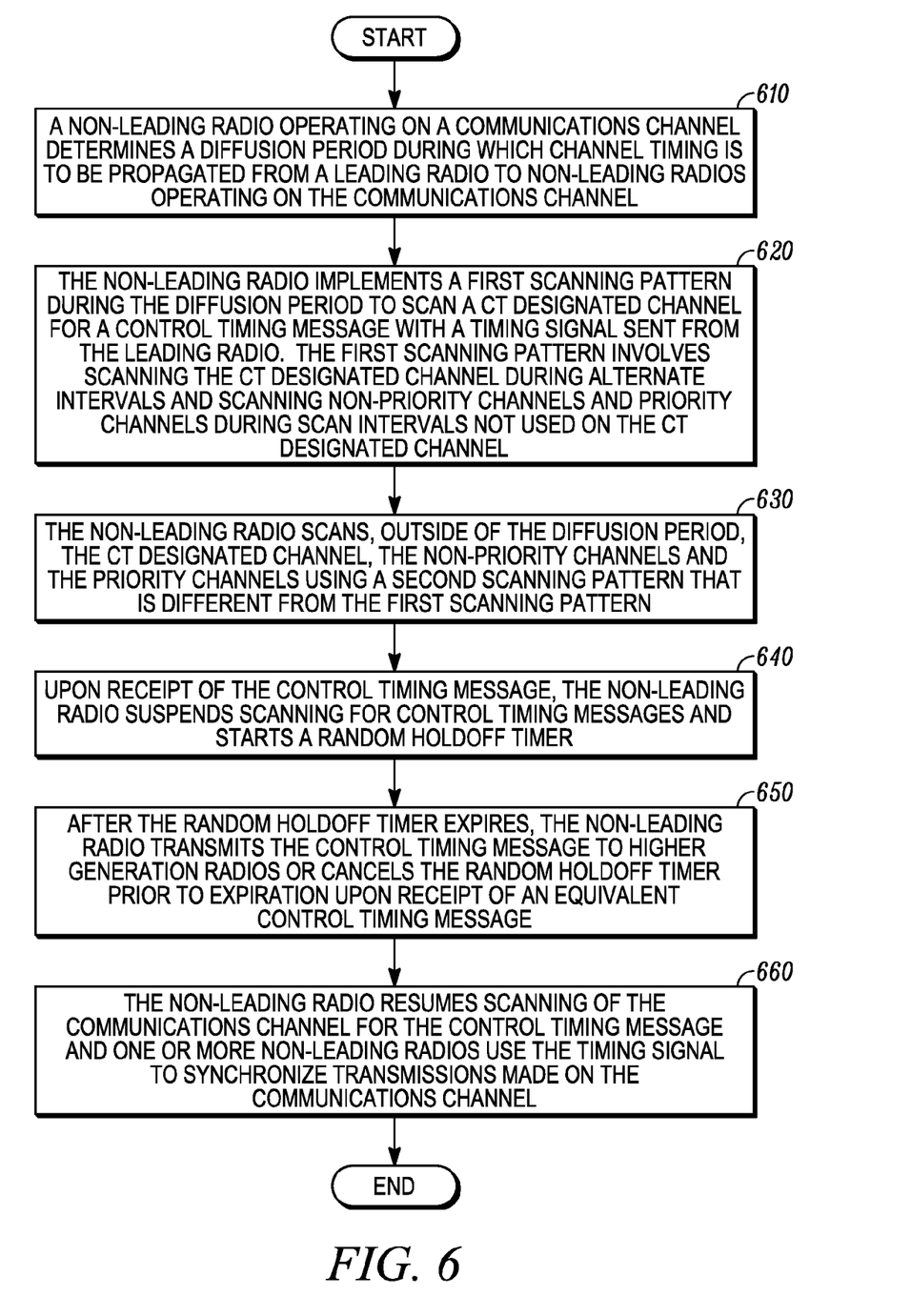
FIG. 6 is a flowchart of a method for enabling a radio to track channel timing and support channel scanning in accordance with some embodiments.

FIG. 6 is a flowchart of a method for enabling a direct mode radio to track channel timing and support channel scanning. In 610, a non-leading radio operating on a communications channel determines a diffusion period during which channel timing is to be propagated from a leading radio to non-leading radios operating on the communications channel. In 620, the non-leading radio implements a first scanning pattern during the diffusion period to scan a CT designated channel for a control timing message with a timing signal sent from the leading radio. The first scanning pattern involves scanning the CT designated channel during alternate intervals and scanning non-priority channels and priority channels during scan intervals not used on the CT designated channel. In 630, the non-leading radio scans, outside of the diffusion period, the CT designated channel, the non-priority channels and the priority channels using a second scanning pattern that is different from the first scanning pattern. In 640, upon receipt of the control timing message, the non-leading radio suspends scanning for control timing messages and starts a random holdoff timer. In 650, the non-leading radio transmits the control timing message to higher generation radios, after the random holdoff timer expires, or cancels the random holdoff timer prior to expiration upon receipt of an equivalent control timing message. In 660, the non-leading radio resumes scanning of the communications channel for the control timing message and one or more non-leading radios use the timing signal to synchronize transmissions made on the communications channel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling a radio operating in a direct mode to track channel timing (CT) and support channel scanning, comprising:

determining, by a non-leading radio operating on a communications channel, a diffusion period during which channel timing is to be propagated from a leading radio to non-leading radios operating on the communications channel;

implementing a first scanning pattern during the diffusion period to scan a CT designated channel for a control timing message with a timing signal sent from the leading radio, by the non-leading radio, wherein first scanning pattern involves scanning the CT designated channel at alternate scan intervals and scanning non-priority channels, priority channels and optionally a user selected channel at scan intervals not used on the CT designated channel, wherein the control timing message includes a synchronization age field to indicate an elapsed period from when the leading radio last transmitted the control timing message, wherein the value of the synchronization age field is adjusted to reflect a delay in transmission of the control timing message; and scanning, by the non-leading radio outside of the diffusion period, the non-priority channels, the priority channels and optionally the CT designated channel or the user selected channel using a second scanning pattern that is different from first scanning pattern, wherein one or more non-leading radios use the timing signal to synchronize transmissions made on the communications channel.

2. The method according to claim 1, further comprising:
starting, by the non-leading radio, a random timer upon receipt of the timing signal;
retransmitting, by the non-leading radio to one or more other non-leading radios of an equal or higher generation, the timing signal after expiration of the random timer or cancelling the random timer prior to expiration upon receipt of an equivalent control timing message; and
resuming scanning of the communications channel for the control timing message.

3. The method according to claim 1, wherein the leading radio and each non-leading radio operating on the communications channel is identified with a generation value, wherein a non-leading radio with a higher generation value is further away from the leading radio than a non-leading radio with a lower generation value.

4. The method according to claim 1, wherein the CT designated channel is a voice designated transmit channel used by the non-leading radio.

5. The method according to claim 1, wherein the control timing message includes an extended prefix.

6. The method according to claim 1, wherein the timing signal sent from the leading radio is a control signal block message that announces the timing of the leading radio.

7. The method according to claim 1, wherein the leading radio announces the timing signal once during a beacon interval and the diffusion period is a predefined period at the beginning at the beacon interval.

8. The method according to claim 2, wherein duration of the diffusion period is determined by a number of anticipated generations associated with non-leading radios operating on the communications channel and by the length for the random timer.

9. The method according to claim 1, further comprising:
determining, by the non-leading radio, that the control timing message has not been received within a predefined period;
transmitting, by the non-leading radio, a request for the control timing message; and accepting, by the non-leading radio, the control timing message included in a response message from another non-leading radio with a lower or equal generation value.

10. The method of claim 9, further comprising initially sending the request without a scan preamble.

11. The method according to claim 1, further comprising;
receiving, by the non-leading radio, a request for the control timing message from another non-leading radio;
starting a random timer; and
responding to the request upon expiration of the random timer, if a response is not sent from another radio of an equivalent or lower generation.

12. A radio operating in a direct mode configured to track channel timing (CT) and support channel scanning, the radio comprises:
a processor comprising:
a determining component configured to determine a diffusion period during which channel timing is to be propagated from a leading radio to non-leading radios operating on a communications channel;
a scanning component configured to implement a first scanning pattern during the diffusion period to scan a CT designated channel for a control timing message with a timing signal sent from the leading radio, wherein first scanning pattern involves scanning the CT designated channel at alternate scan intervals and scanning non-priority channels, priority channels and optionally a user selected channel at scan intervals not used on the CT designated channel, wherein the control timing message includes a synchronization age field to indicate an elapsed period from when the leading radio last transmitted the control timing message, wherein the value of the synchronization age field is adjusted to reflect a delay in transmission of the control timing message; and
the scanning component being further configured to scan, outside of the diffusion period, the non-priority channels, the priority channels and optionally the CT designated channel or the user selected channel using a second scanning pattern that is different from first scanning pattern,
wherein the non-leading radio uses the timing signal to synchronize transmissions made on the communications channel.

13. The radio according to claim 12, being further configured to:
start a random timer upon receipt of the timing signal;
retransmit, to one or more other non-leading radios of an equal or higher generation, the timing signal after expiration of the random timer or cancel the random timer prior to expiration upon receipt of an equivalent control timing message; and
resume scanning of the communications channel for the control timing message.

14. The radio according to claim 12, wherein the radio is identified with a generation value, wherein the generation value indicates how far the radio is from the leading radio.

15. The radio according to claim 12, being further configured to:
determine that the control timing message has not been received within a predefined period;
transmit a request for the control timing message; and
accept the control timing message included in a response message from another non-leading radio with a lower or equal generation value.

16. The radio according to claim 12, being further configured to:
  receive a request for the control timing message from another non-leading radio;
  start a random timer; and
  respond to the request upon expiration of the random timer, if a response is not sent from another radio of an equivalent or lower generation.

17. A system configured to enable a radio operating in a direct mode to track channel timing (CT) and support channel scanning, the system comprising:
  a leading radio device operating on a communications channel; and
  at least one non-leading radio device operating on the communications channel,
  wherein the non-leading radio device is configured to determine a diffusion period during which channel timing is to be propagated from a leading radio device to non-leading radio devices operating on a communications channel,
  wherein the non-leading radio device is configured to implement a first scanning pattern during the diffusion period to scan a CT designated channel for a control timing message with a timing signal sent from the leading radio device, wherein first scanning pattern involves scanning the CT designated channel at alternate scan intervals and scanning non-priority channels, priority channels and optionally a user selected channel at scan intervals not used on the CT designated channel, wherein the control timing message includes a synchronization age field to indicate an elapsed period from when the leading radio device last transmitted the control timing message, wherein the value of the synchronization age field is adjusted to reflect a delay in transmission of the control timing message,
  wherein the non-leading radio device is configured to scan, outside of the diffusion period, the non-priority channels, the priority channels and optionally the CT designated channel or the user selected channel using a second scanning pattern that is different from first scanning pattern, and
  wherein non-leading radio devices use the timing signal to synchronize transmissions made on the communications channel.

18. The system according to claim 17, wherein the leading radio device and each non-leading radio device operating on the communications channel is identified with a generation value, wherein a non-leading radio device with a higher generation value is further away from the leading radio device than a non-leading radio device with a lower generation value.

19. The system according to claim 18, wherein each non-leading radio device is configured to:
  start a random timer upon receipt of the timing signal;
  retransmit, to one or more other non-leading radio devices of an equal or higher generation, the timing signal after expiration of the random timer or cancel the random timer prior to expiration upon receipt of an equivalent control timing message; and
  resume scanning of the communications channel for the control timing message.

* * * * *

UNITED STATES PATENT AND TRADEMARK OFFICE
CERTIFICATE OF CORRECTION

PATENT NO. : 8,660,111 B2  
APPLICATION NO. : 13/166151  
DATED : February 25, 2014  
INVENTOR(S) : Wiatrowski et al.

Page 1 of 1

It is certified that error appears in the above-identified patent and that said Letters Patent is hereby corrected as shown below:

In the specification

In Column 10, Line 64, delete "memory 502" and insert -- memory 506 --, therefor.

In Column 11, Line 3, delete "memory 502," and insert -- memory 506, --, therefor.

In the claims

In Column 13, Line 27, in Claim 2, delete "comprising;" and insert -- comprising: --, therefor.

In Column 13, Lines 41-42, in Claim 3, delete "wherein a" and insert -- wherein the --, therefor.

In Column 13, Line 43, in Claim 3, delete "than a" and insert -- than the --, therefor.

In Column 13, Line 62, in Claim 9, delete "comprising;" and insert -- comprising: --, therefor.

In Column 14, Line 5, in Claim 10, delete "method of claim" and insert -- method according to claim --, therefor.

In Column 14, Line 7, in Claim 11, delete "comprising;" and insert -- comprising: --, therefor.

In Column 16, Line 11, in Claim 17, delete "wherein non-" and insert -- wherein the non- --, therefor.

In Column 16, Line 17, in Claim 18, delete "wherein a" and insert -- wherein the --, therefor.

In Column 16, Line 19, in Claim 18, delete "than a" and insert -- than the --, therefor.

Signed and Sealed this  
Third Day of May, 2016

Michelle K. Lee  
*Director of the United States Patent and Trademark Office*